(12) United States Patent
Goldner

(10) Patent No.: US 6,262,415 B1
(45) Date of Patent: Jul. 17, 2001

(54) ORIENTATION SENSOR SYSTEM WITH HIGH PRECISION OPTICAL INTERROGATION AND DENSE MULTIPLEXING

(75) Inventor: Eric Lee Goldner, Valencia, CA (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/363,473

(22) Filed: Jul. 29, 1999

(51) Int. Cl.[7] ............................................. G01J 1/04
(52) U.S. Cl. .......................... 250/227.11; 250/227.21; 250/231.14; 250/231.18; 33/363 K; 340/870.13
(58) Field of Search .................... 250/227.11, 227.19, 250/227.21, 227.23, 227.24, 227.27, 231.1, 231.13, 231.14, 231.18; 359/115, 123, 124, 125, 127, 132, 135, 138, 141; 33/355 R, 363 R, 363 K; 340/850, 851, 870.13, 870.17

(56) References Cited

U.S. PATENT DOCUMENTS

| | | |
|---|---|---|
| 4,769,290 | 9/1988 | Hettich et al. . |
| 4,796,365 | 1/1989 | Hudson . |
| 4,901,123 | 2/1990 | Noguchi et al. . |
| 4,990,970 | 2/1991 | Fuller . |
| 5,042,157 * | 8/1991 | Garret et al. ........................ 33/363 K |
| 5,079,845 | 1/1992 | Childers . |
| 5,272,476 * | 12/1993 | McArthur et al. .............. 340/870.13 |
| 5,311,603 | 5/1994 | Fidric . |
| 5,608,234 | 3/1997 | Jiang . |
| 5,748,350 | 5/1998 | Pan et al. . |

* cited by examiner

Primary Examiner—John R. Lee
(74) Attorney, Agent, or Firm—Bright & Lorig, P.C.; David M. Kleiman

(57) ABSTRACT

An apparatus and method for measuring the orientation of a platform by receiving and reading signals from one or more orientation sensors, such as a magnetic compass, using optical interrogation, telemetry, and multiplexing, with the signals passing through a single supply/return optical waveguide.

18 Claims, 8 Drawing Sheets

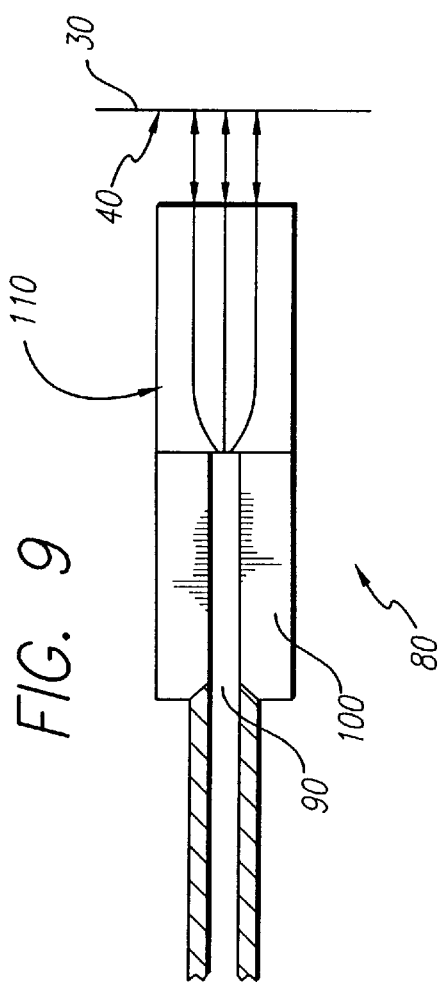
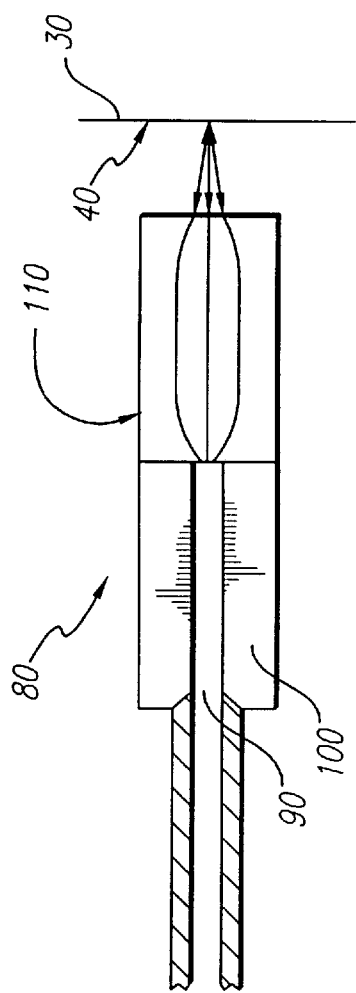
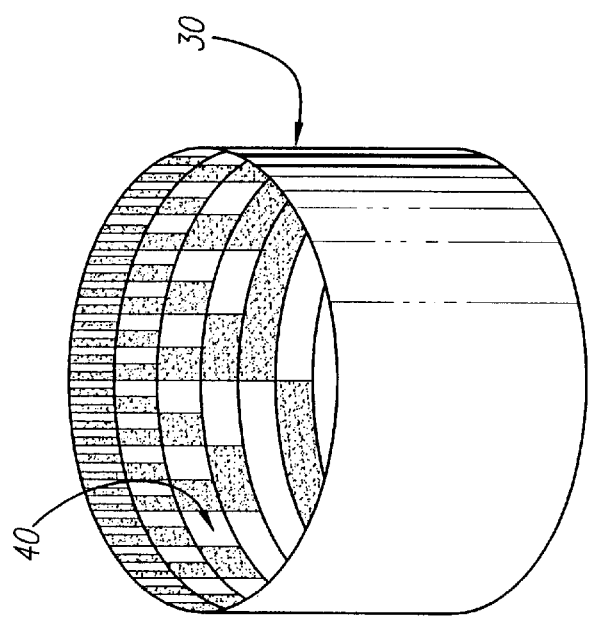

ORIENTATION SENSOR SYSTEM WITH HIGH PRECISION OPTICAL INTERROGATION AND DENSE MULTIPLEXING

BACKGROUND OF THE INVENTION

This invention relates to a system and method for receiving and reading signals from an orientation sensor at great distances from a receiver using optical pickoff, signal multiplexing and optical telemetry with a single supply/return waveguide between the sensor and receiver.

The field to which the invention relates is that of orientation sensor systems using optical pickoff and optical telemetry.

BRIEF SUMMARY OF THE INVENTION

This invention utilizes optical pickoff and optical telemetry combined with optical multiplexing for receiving and reading signals from one or more orientation sensors, such as magnetic compasses. In these systems the sensors may be located at a great distance from the receiver. By using optical multiplexing, the orientation of a sensor can be interrogated with high precision, and the result returned over great distances, without susceptibility to electrical interference using a single supply/return waveguide, as opposed to the multiple waveguides needed by the prior art.

BRIEF DESCRIPTION OF THE DRAWINGS

FIG. 5 shows the pattern of FIG. 3 on the interior surface of a right circular cylinder.

FIG. 8 is a cross section of an optical interrogator which focuses light.

FIG. 9 is a cross section of an optical interrogator which collimates light.

DETAILED DESCRIPTION OF THE INVENTION

The invention is a system and method for the high precision interrogation of an orientation sensor which uses signal multiplexing and a single optical supply/return waveguide to determine the orientation of a body of interest.

Figure 2:
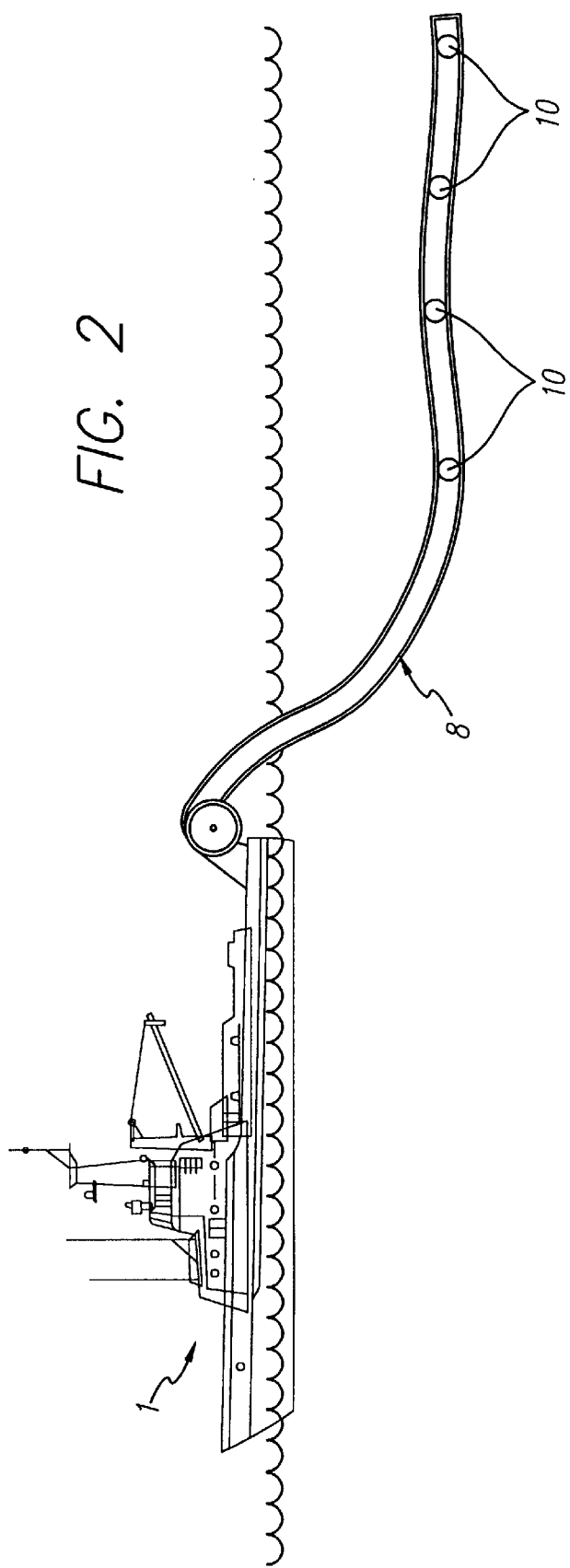
FIG. 2 is an illustration of how the orientation sensor system of FIG. 1 might be applied to measure the orientation of a platform, such as, for example, the towed hydrophone array shown.

An example of how such an orientation system may be used is shown in FIG. 2. Orientation sensors 10 are contained within a hydrophone array 8 being towed behind boat 1. Each orientation sensor 10 contains, for example, a magnetic compass that permits measurement of the orientation of the array 8 at the location of sensor 10 with respect to the Earth's Magnetic North. As explained below in greater detail, the measurement is made using optical interrogation and multiplexing so as to permit the measurements to be made with high precision at great distances (e.g., 1–10 km) and using only a single optical supply/return waveguide. While the example shown in FIG. 2. is of a magnetic compass sensor 10 in a towed hydrophone array 8, the present invention may be used to measure the orientation or direction of any object (such as array 10) relative to a reference frame (such as the Earth.)

Figure 1:
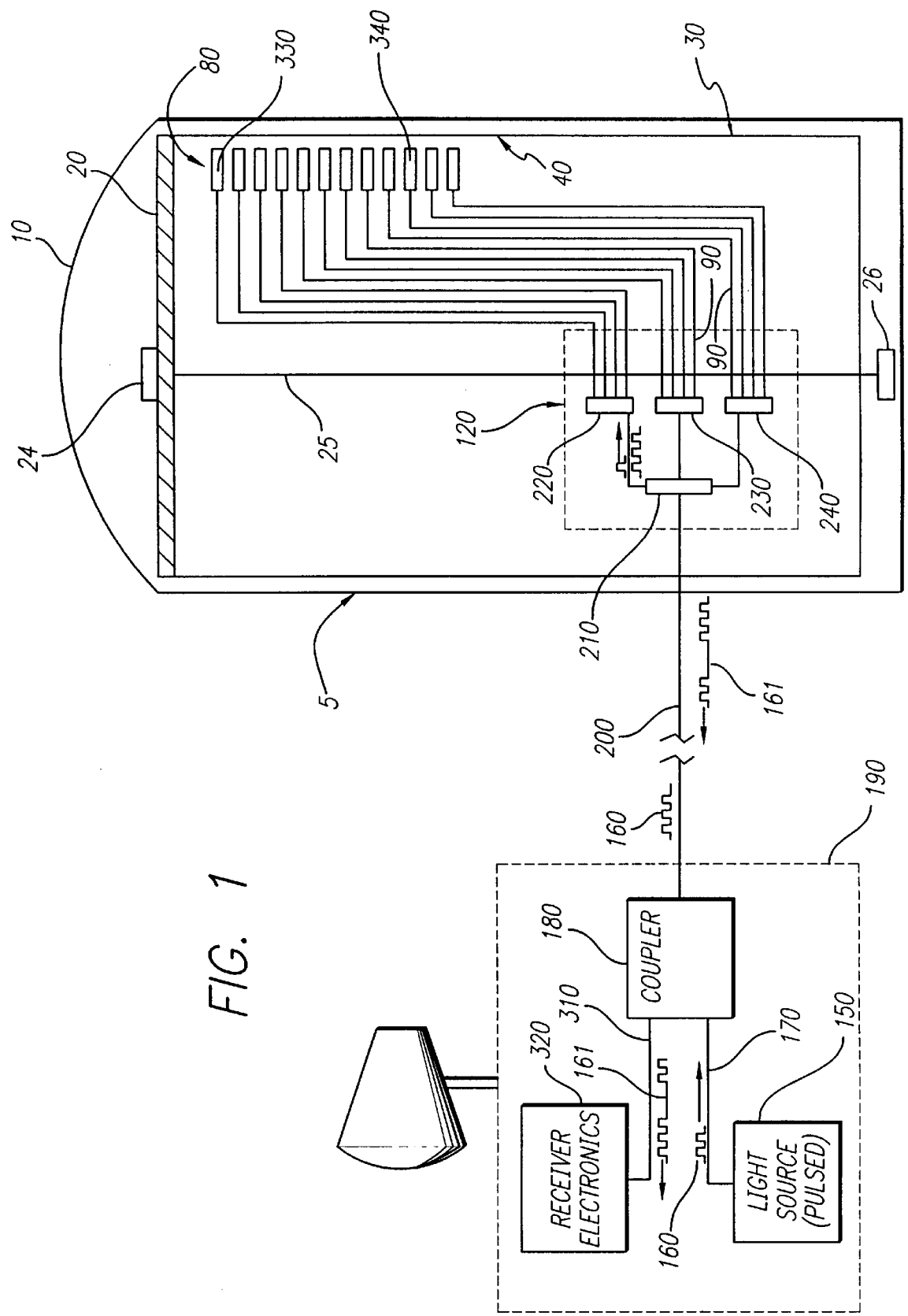
FIG. 1 is a cut away elevation view of a magnetic compass orientation sensor system using time division multiplexing and demultiplexing.
Figure 3:
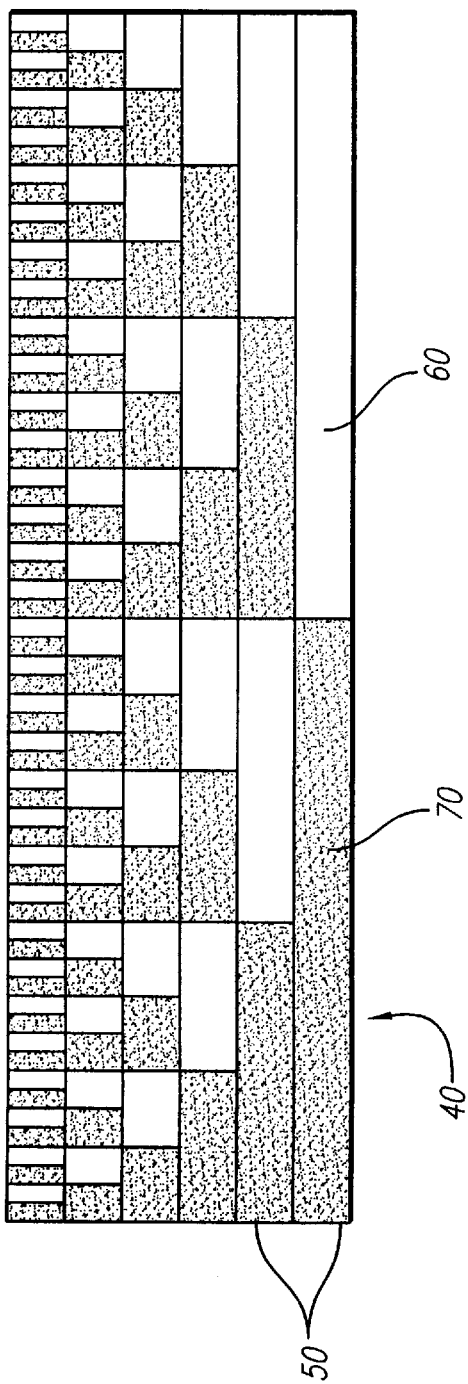
FIG. 3 is an elevation view of a pattern of reflective and non-reflective bands which may be disposed upon a surface of a moveable structure in close proximity to the optical interrogators of an orientation sensor of FIG. 1.
Figure 6:
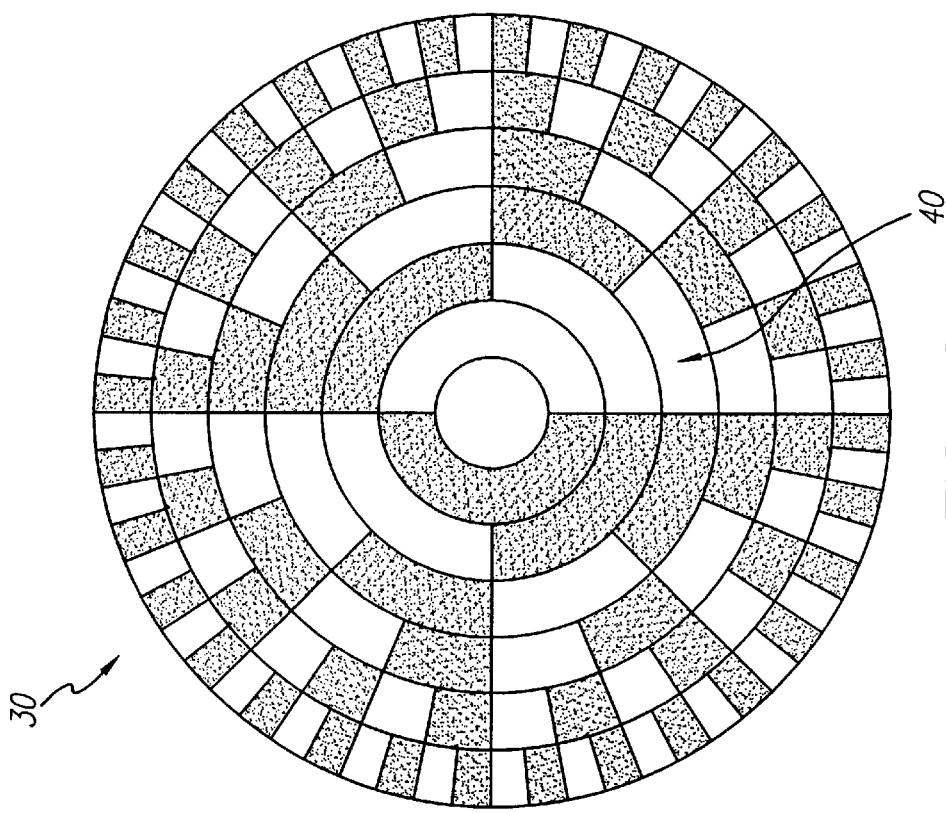
FIG. 6 is a plan view of a pattern of reflective and non-reflective bands which may be disposed in concentric rows upon a surface of a moveable structure that is a flat circular disk and which is in close proximity to the optical interrogators of an orientation sensor of FIG. 1

In a preferred embodiment of the invention, sensor 10 is a magnetic compass, as shown, for example, in FIG. 1. Magnet 20 rotates freely around shaft 25, which is supported by bearings 24 and 26 so as to always align with the Earth's magnetic field to discern magnetic North. The bearings provide a low friction rotational coupling between magnet 20 and the platform of interest 5, in this case housing 5 which contains orientation sensor 10. In the example of FIG. 2, housing 5 would be rigidly attached within cable 8. Magnet 20 is rigidly attached to moveable structure 30 which has a surface 40 of reflective bands 60 and non-reflective bands 70, as shown for example in FIG. 3. Structure 30 may be of several different shapes, but a preferred embodiment is a hollow right circular cylinder with patterned surface 40 on the interior, as shown, for example, in FIG. 5. Another embodiment is for structure 30 to be a flat disk with surface 40 on one side, as shown for example, in FIG. 6. Structure 30, as shown in FIG. 1 (a right circular cylinder), remains fixed in orientation with respect to the Earth due to its attachment to magnet 20 and its ability to rotate with Magnet 20 about shaft 25. Fluid may be incorporated into sensor 10 to provide mechanical damping. Sensor 10 may also be gimbal-mounted such that its orientation is maintained constant relative to gravity.

Reflective bands 60 and non-reflective bands 70 are arranged in parallel rows 50, as shown, for example, in FIG. 2. Non-reflective bands 70 may be black or transparent, and reflective bands 60 may be silver or some other suitable reflecting material. For example, stacks of alternating high and low refractive index dielectric materials may be coated on a substrate to form highly reflective or highly transmissive regions. Such an optical element is described in a U.S. Pat. No. 4,769,290, authored by L. Hettich et al.

Rows 50 each represent one bit of information describing the orientation of sensor 10 relative to a reference body (Earth, for example). For example, a first row 50 may have one non-reflective band 70 spanning and corresponding to 0–179 degrees of arc, and one reflective band 60 spanning and corresponding to 180–359 degrees of arc. The next row 50 may have two non-reflective bands 70 and two reflective bands 60, to increase the measurement precision to quadrants (each spanning 90 degrees of arc). Each additional row 50 has an increasing number of reflective bands 60 and non-reflective bands 70 to incrementally increase the measurement precision.

A preferred embodiment has twelve rows 50, with each succeeding row 50 having twice the number of reflective bands 60 and non-reflective bands 70 as the preceding row 50. If r is the number of rows, then the measurement precision achievable with this approach is $\frac{1}{2}^r$. In the preferred embodiment, twelve rows provide a measurement precision of $\frac{1}{2}^{12}$ or 1 part in 4096. This allows for resolution of less than +/−0.1 degrees within a possible full range of 360 degrees. Other embodiments may use more or fewer rows 50 depending upon the precision required.

Rows 50 are interrogated by light pulses from optical interrogators 80 located sufficiently near surface 40. Interrogators 80 are fixed relative to housing 5 and do not rotate with moveable structure 30, as shown for example in FIG. 1. Interrogators 80 are comprised of lenses 110 bonded to the ends of delay optical fibers 90, as shown, for example in FIG. 8. An example of a suitable lens is a 0.18 pitch GRIN (Graduated Refractive INdex) rod lens, model number SLW 180 018 156 A2) manufactured by NSG America, Inc. A suitable length of jacket material is removed from each fiber 90, and the stripped end is inserted into and adhesive bonded to the inside diameter of a ferrule 100. The free end of the ferrule 100 is subsequently polished normal to the propagation axis of light in fiber 90. Suitable ferrules include silica capillary tubes such as those manufactured by GSI Lumonics. The combination of fiber 90 and ferrule 100 is subsequently bonded to the end of lens 110. Lens 110 may collimate (as shown in FIG. 9) or focus (as shown in FIG. 8) diverging light pulses leaving fiber 90 onto surface 40, and re-focuses the pulses reflected from surface 40 onto the end of fiber 90.

Figure 10:
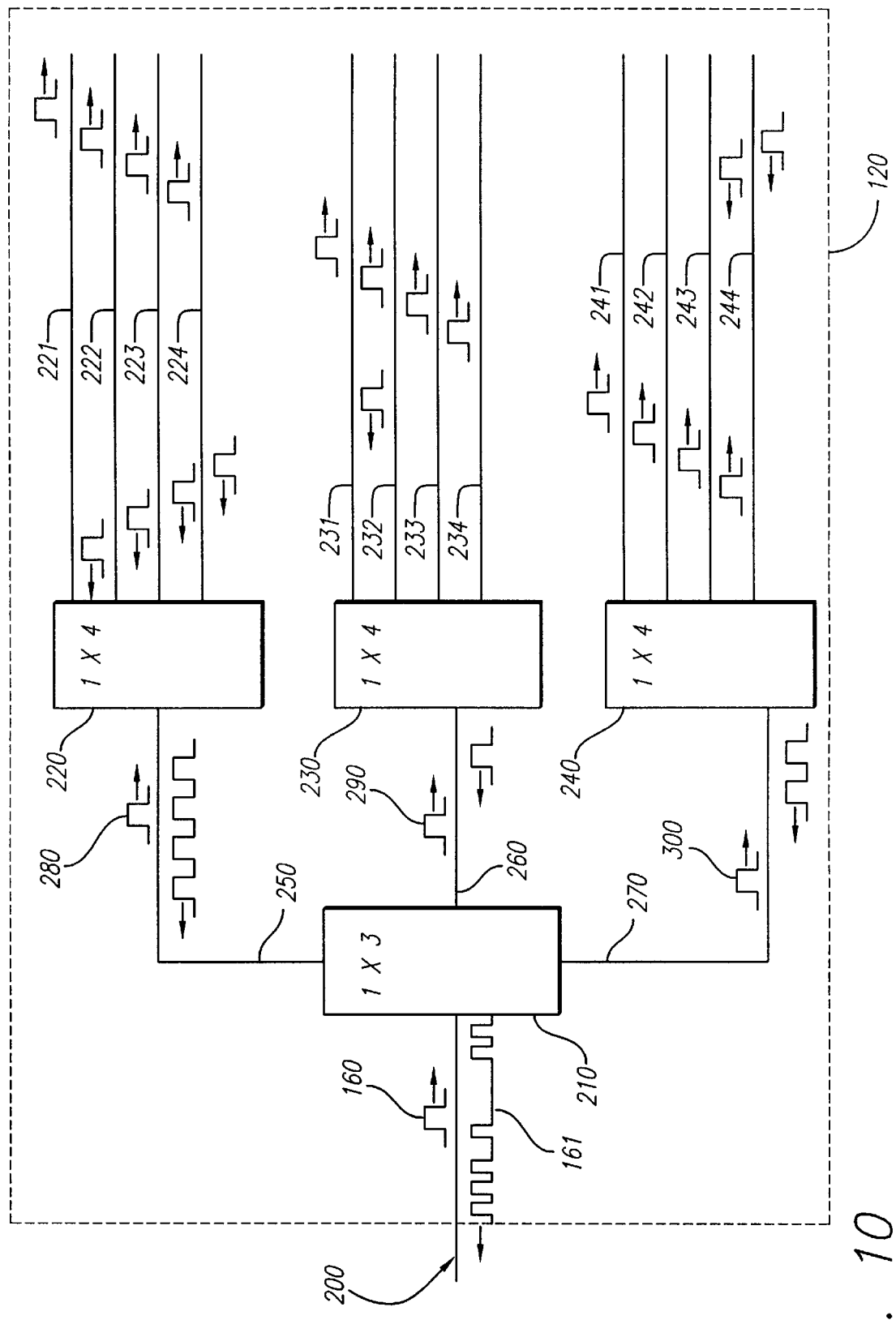
FIG. 10 is a schematic view of a TDM assembly.

Within sensor 10 is a Time Division Multiplexing/ Demultiplexing (TDM) assembly 120, as shown, for example in FIG. 1 and FIG. 10. TDM assembly 120 remains fixed in position relative to housing 5 and does not rotate with structure 30. TDM assembly 120 is an assembly of optical fiber couplers and of delay optical fibers, as shown, for example, in FIG. 10. TDM assembly 120 receives a light pulse 160 from waveguide 200 which passes through the internal optical couplers and delay fibers to produce a plurality of time differentiated light pulses for delivery to optical interrogators 80, as shown, for example in FIG. 1 and 10. The internal construction and operation of TDM assembly 120 is explained below in greater detail. Light pulses reflected back from surface 40 are collected by optical interrogators 80 and travel back through TDM assembly 120 and are multiplexed into a composite signal 161. Signal 161 travels through waveguide 200 through source/receiver 1×2 coupler 180 to receiver 320 where it is electronically demultiplexed and used to indicate the orientation of sensor 10 at a display unit, as shown for example in FIG. 1.

Optical power for the system is provided by short coherence length (on the order of one hundred microns or less, for example), pulsed light source 150 (containing, for example, an electrically pulsed broad band fiber source (U.S. Pat. No. 5,311,603, for example), SLED (superluminescent diode, U.S. Pat. No. 4,901,123, for example). LED (U.S. Pat. No. 4,990,970, for example), or ELED (U.S. Pat. No. 5,608,234, for example) as the light source, with an electrical input or a serial combination of a continuous wave optical source (broad band fiber source, SLED, LED or ELED, for example) and for example, an integrated optic chip containing a Mach Zehnder interferometer for pulsing.)

Pulses 160 travel from source 150 through waveguide 170 to a nearby source/receiver 1×2 coupler 180. Pulses 160 are routed through source/receiver coupler 180 to waveguide 200 for delivery to TDM assembly 120 in sensor 10. Because light, as opposed to electricity, and low loss optical fiber (SMF-28 telecommunications fiber produced by Corning, Inc., for example) are being used for telemetry, sensor 10 may be located at a great distance from housing 190 (e.g. 1–10 kilometers).

TDM assembly 120 is comprised of a (1×n) coupler and n (1×m) couplers where n and m are both greater than or equal to 2. FIG. 9 shows, for example, a preferred embodiment of TDM assembly 120 where n=3 and m=4. Suitable optical fiber couplers are commercially available from companies such as Gould Fiberoptics. Thus, TDM assembly 120 is comprised of a 1×3 coupler 210 connected to three 1×4 couplers 220, 230, 240 by delay fibers 250, 260, 270. Twelve delay fibers 221, 222, 223, 224, 231, 232, 233, 234, 241, 242, 243 and 244 connect couplers 220, 230, 240 to interrogators 80 (see FIG. 1). The values for n and m will vary with the application (i.e., the number of interrogators 80.)

As shown in FIG. 9, coupler 210 divides each incoming pulse 160 into three pulses 280, 290, and 300. Pulse 280 travels through fiber 250 to coupler 220. Pulse 290 travels through fiber 260 to coupler 230. Pulse 300 travels through fiber 270 to coupler 240. Fibers 250, 260, and 270 are of different lengths. As a result pulses 280, 290, and 300 arrive at couplers 220, 230, and 240 at different times—the time differences being determined by the relative lengths of fibers 250, 260 and 270.

Upon arriving at couplers 220, 230, and 240, each pulse is further divided into four pulses. The resulting twelve pulses (three pulses each divided into four pulses=twelve pulses) travel through fibers 221, 222, 223, 224, 231, 232, 233, 234, 241, 242, 243 and 244 to interrogators 80 (not shown). Delay fibers 90 from any given coupler (220, 230 or 240) are each a different length. Each set of four delay fibers 90 from couplers 220, 230, and 240 may be identical. Alternatively, all twelve delay fibers 90 may each have a unique length. In either configuration, the twelve pulses arrive at interrogators 80 at different times.

The pulses exit interrogators 80 and strike surface 40. If a pulse strikes a non-reflective band 70, the pulse will be absorbed by or be transmitted through surface 40. If a pulse strikes a reflective band 60 then it will reflect back into interrogator 80 from which it left.

The reflected pulses (a series of light and no light conditions) collected by interrogators 80 travel back through fibers 90 to the 1×4 couplers. The 1×4 couplers multiplex the reflected pulses into composite signals which travel through fibers 250, 260 and 270 to coupler 210. Coupler 210 multiplexes the signals received from couplers 220, 230, and 240 into another, higher level, composite signal. This multiplexed signal travels through waveguide 200 to source/ receiver coupler 180 which routes it to receiver 320 by way of coupler 180 and waveguide 310. While the preferred embodiment of the TDM shown in FIG. 10 uses four optical fiber couplers and 15 delay fibers, the number and characteristics of these components may vary, so as to accommodate sensors with more or less resolution (thus a different number of optical interrogators).

Receiver electronics 320 contains a photodetector, amplification circuitry, filtering, time division demultiplexing circuitry, and circuitry to identify the state of each pulse (on versus off). This enables receiver 320 to determine the orientation of sensor 10 based upon the state and the arrival time of each pulse. As an example, the time for a pulse 160 to reach interrogator 330 and return (if reflected) to receiver 320 is 3.3 microseconds, as shown in FIG. 1. In contrast, it takes 3.6 microseconds for a pulse 160 to reach interrogator 340 and return to receiver 320. The reason for the different travel times between pulses is the use of the delay fibers in TDM assembly 120.

A light pulse leaves the light source 150 at time equals 0. Thus, when the time equals 3.3 microseconds, receiver 320 "expects" a signal from interrogator 330. At that time receiver 320 assigns a 1 or 0 value for interrogator 330 depending upon whether a reflected pulse is received (i.e., 1 or 'on') or not (i.e., 0 or 'off'). When the time equals 3.6 microseconds receiver 320 expects a pulse from interrogator 340 and similarly assigns a 1 or 0. The process continues until a value has been assigned to each interrogator 80 of sensor 10.

For a sensor 10 with twelve interrogators 80, as shown in FIG. 1, this results in a twelve bit binary number, such as, for example, 111000000000. Each such 12 bit number represents the orientation of sensor 10 (e.g., the returned pulse train might be 111000000000, corresponding to 45.0 degrees NW).

Figure 4:
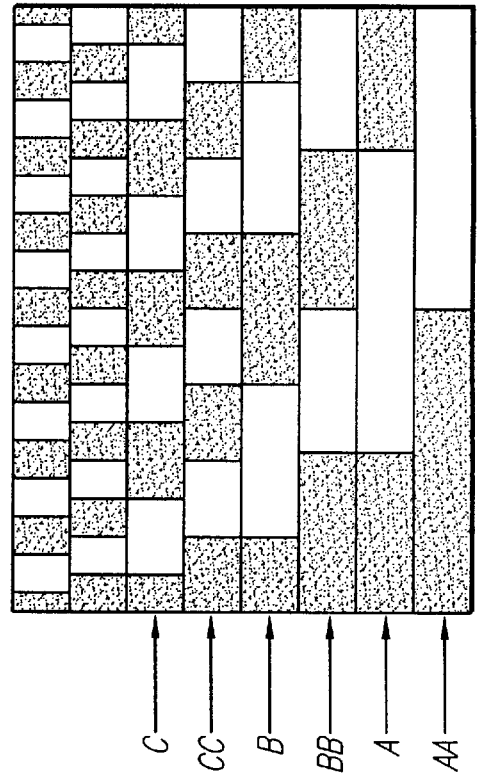
FIG. 4 shows the pattern of FIG. 3 with additional rows of reflective and non-reflective bands included in the pattern on the surface of the moveable structure oriented in quadrature (shifted by one half of a reflective segment).
Figure 7:
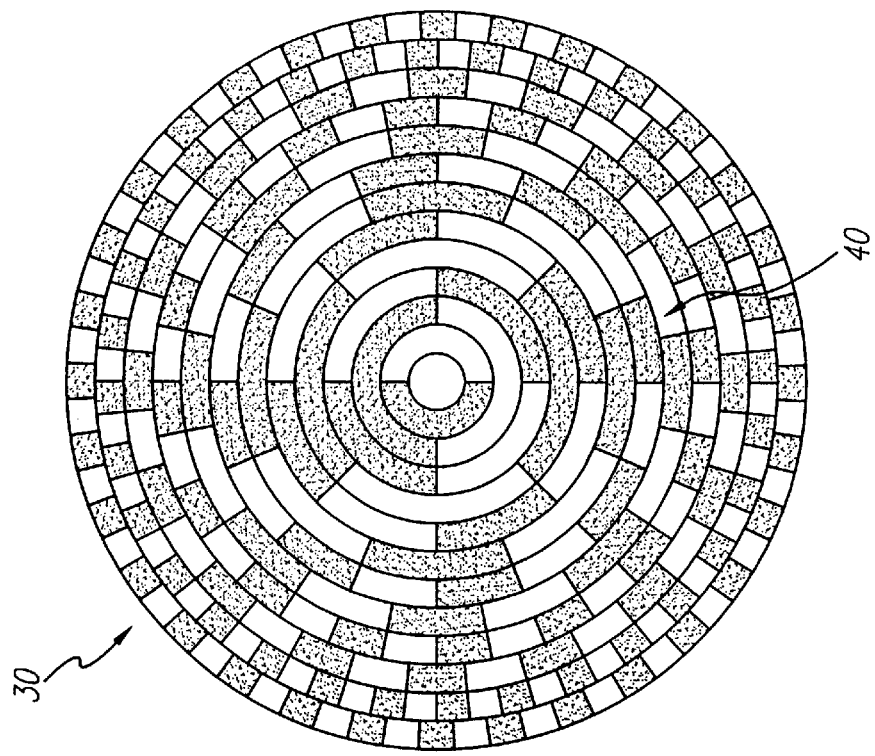
FIG. 7 is a plan view of the pattern of FIG. 6 with additional concentric rows of reflective and non-reflective bands included in the pattern on the surface of the moveable structure oriented in quadrature (shifted by one half of a reflective segment).

To resolve possible ambiguity of a particular pulse state if half of the light is reflected (for example, when the boundary between two adjacent bands is illuminated by the interrogator-especially for very slow angular movements), one or more additional rows of reflective and non-reflective bands may be included in the pattern on the surface of the moveable structure. The size of reflective and non-reflective regions on these rows are the same as their corresponding rows, but are shifted by one half of a reflective segment. An example of this embodiment when structure 30 is a right circular cylinder is shown in FIG. 4, where rows AA, BB and CC are the corresponding quadrature rows for A, B and C. FIG. 7 shows an alternate embodiment of feature when structure 30 is flat disk.

Figure 11:
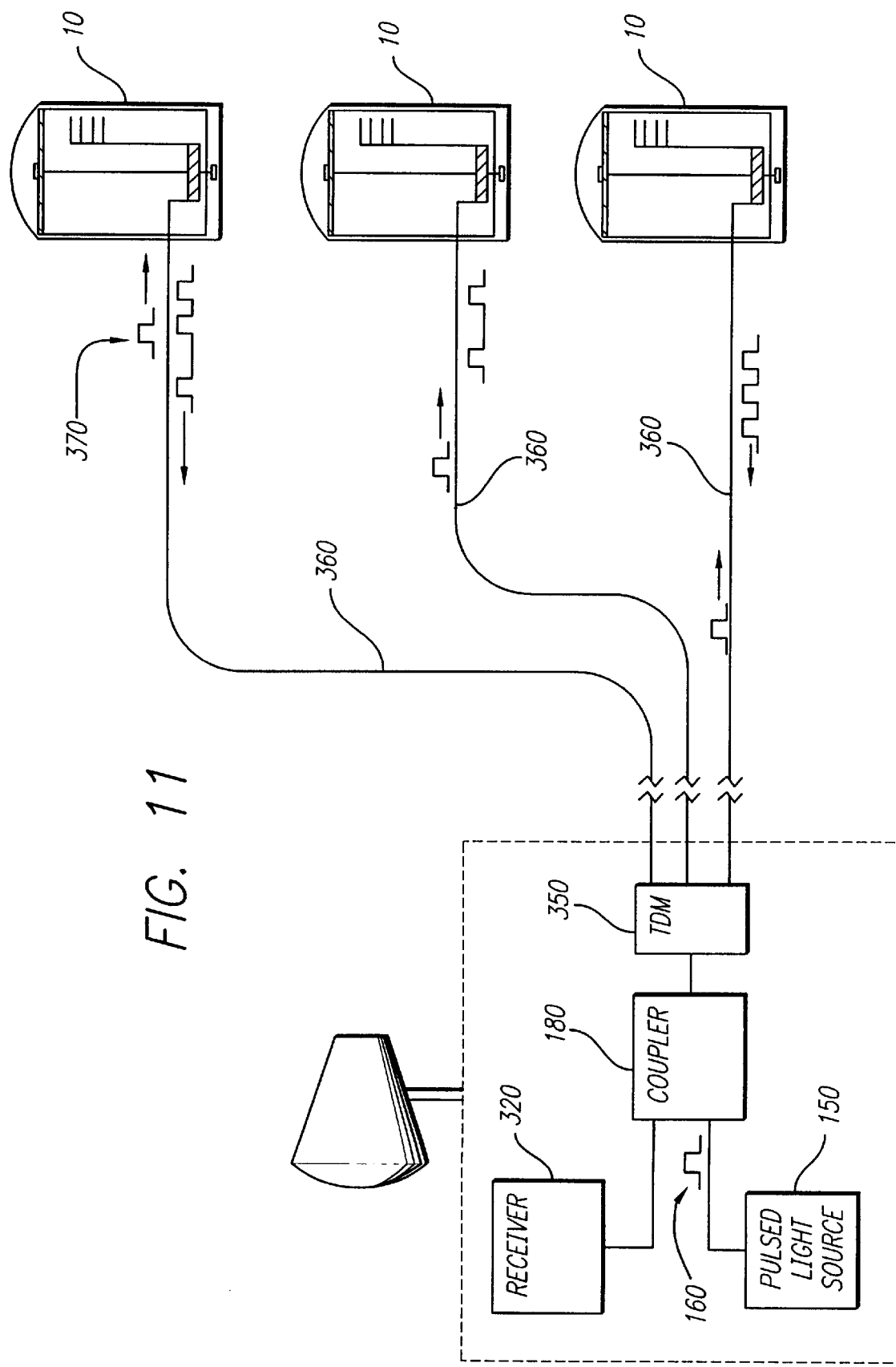
FIG. 11 is a schematic view of an orientation sensor system using multiple orientation sensors and TDM.

The above TDM telemetry approach may be extended to multiple sensors 10, as shown, for example, in FIG. 11. A source/receiver TDM assembly 350, similar in construction to TDM assembly 120, is inserted between source/receiver coupler 180 and branch waveguides 360. Pulses 160 entering source/receiver TDM assembly 350 are divided by one or more optical fiber couplers into time differentiated pulses 370 equal in number to the number of branch waveguides 360 which may be optical fibers. Light pulses 370 travel through branch waveguides 360 to sensors 10. Reflected, multiplexed pulse signals from each sensor 10 travel back to source/receiver TDM assembly 350 where they are multiplexed into a composite signal which is routed through source/receiver coupler 180 to receiver 320. As described above, receiver 320 will identify from which interrogator 80 and from which sensor 10 demultiplexed pulses come, based upon their arrival time.

Figure 12:
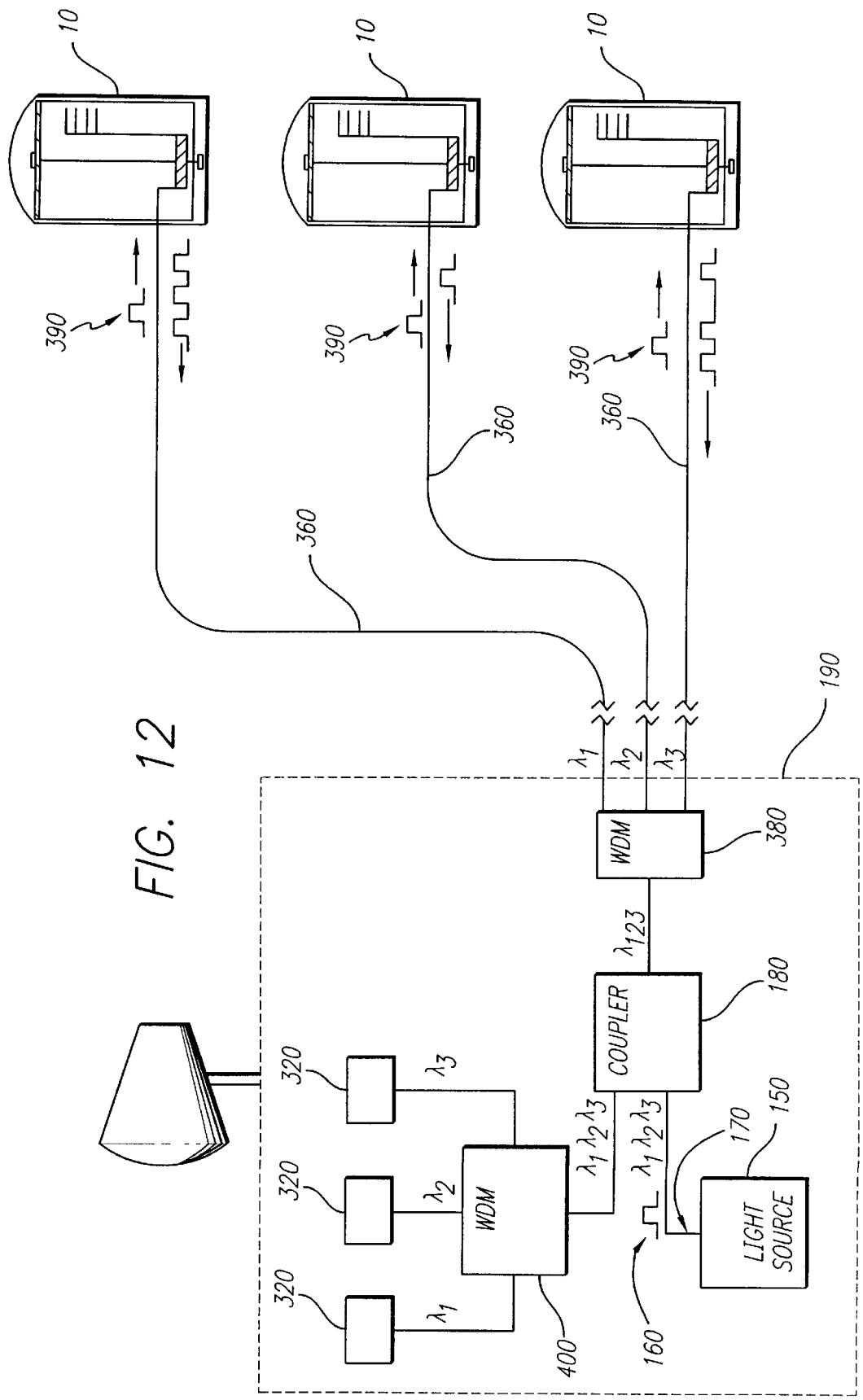
FIG. 12 is a schematic view of an orientation sensor system using wavelength division multiplexing couplers and TDM with multiple orientation sensors.

An alternative method for use with multiple sensors 10 is that shown in FIG. 12. A wavelength division multiplexing (WDM) coupler 380 (such as a 2-wavelength WDM part # 40-20331-55-12231 manufactured by Gould Electronics, or the multiple wavelength dense WDM described in U.S. Pat. No. 5,748,350 to Jing-Jong Pan et. al. at column 1, lines 50–67 or those available from E-Tek Dynamics) is inserted between source/receiver coupler 180 and branch waveguides 360. Pulses 160 entering WDM coupler 380 are divided into pulses 390 of different wavelengths $\lambda_1$, $\lambda_2$, and $\lambda_3$. Wavelength differentiated pulses 390 travel through each branch waveguide 360 to sensors 10. Reflected time multiplexed signals from each sensor 10 travel back to WDM coupler 380 where they are wavelength multiplexed and routed through sensor/receiver coupler 180 to a second WDM coupler 400. WDM coupler 400 demultiplexes the signal and routes the wavelength for each sensor 10 to a separate receiver 320. As described above, each receiver 320 will time demultiplex the incoming signal of a particular wavelength and identify which reflected pulses come from which interrogator 80 in a given orientation sensor 10. WDM 380 may be located near or remote from the light source. Likewise, WDM 400 may be located near or remote from the light source.

One of the many advantages of this invention is the ability to incorporate electrical devices (which may emit radio frequency (RF) signals) into or in the vicinity of sensor 10 without adversely affecting the orientation measurement. An example of one such application would be a sensor 10 that is a magnetic compass and which incorporates electronic dither circuitry to produce a very small, regularly changing magnetic field which moves rotatable magnet 20 slightly so as to overcome any effects of static friction under conditions of low rates of change of orientation. Such electronic dither circuitry is described in U.S. Pat. No. 4,796,365 to Hudson in FIG. 7, and is hereby incorporated by reference.

What follows is a glossary of terms to aid in the understanding of the disclosure and claims.

| GLOSSARY OF TERMS | |
|---|---|
| 1 × n coupler | A coupler which can route light energy between 1 input and n outputs where n is an integer greater than 1, such as, for example n = 3 for a 1 × 3 coupler which can route light energy between four points. |
| 1 × m coupler | A coupler which can route light energy between 1 input and m outputs where m is an integer greater than 1, such as, for example m = 4 for a 1 × 4 coupler which can route light energy between five points. |
| Broad Band Fiber Source Coupler | A light source of multiple wavelengths. Any device which can be used to route light energy between three or more points. |
| Delay Time | The time for light energy to travel through an optical fiber. |
| Delay optical fiber | An optical fiber with a known length and composition such that the time for light to travel its length is also known. |
| Dither Circuitry | Any device which uses electricity to produce a time-varying magnetic field. |
| ELED | A light emitting diode which emits light from its edge. |
| Ferrule | An element, such as a rigid tube, used to contain and align an optical fiber. |
| Gimbal Mounted | The method of supporting a structure such that its orientation is constant relative to gravity. |
| Housing | A structure used to contain components, such as, for example, an orientation sensor. |
| Intermediate TDM Assembly | A TDM assembly through which a source/receiver coupler is optically connected to a plurality of orientation sensors. |
| LED | A light emitting diode. |
| Lens | An optical element which can collimate, focus, or otherwise refract light. |
| Light source | Any device which produces light energy. |
| Magnet | Any object which produces a magnetic field. |
| Optical Waveguide | Any structure which can guide light in a rectilinear or curved path, and which may include, for example, optical fibers. |
| Moveable Structure | A component of an orientation sensor which can move with respect to a platform whose orientation is of interest. |

-continued

GLOSSARY OF TERMS

| Term | Definition |
|---|---|
| Optical | Any portion, or all, of the electromagnetic spectrum, such as for example, visible light. |
| Optical Interrogator | Any device or object capable of transmitting and focusing or collimating light as well as receiving it. |
| Orientation Sensor | Any device, such as, for example, a magnetic compass, which measures the orientation or direction of an object relative to another object or a reference frame. |
| Platform | Any object whose orientation is being measured, such as, for example, a cable containing the orientation sensor which is towed behind a boat. |
| Pulsed light source | Any device which produces pulses of light energy. |
| Receiver | Any device which can convert multiplexed optical signals into demultiplexed electrical signals to determine information, such as, for example, the orientation of a sensor. |
| Reference Frame | A location or set of axes which serve as a reference to which the position or motion of a body is described or measured. |
| Sensor TDM Assembly | The TDM assembly in an orientation sensor which is directly connected to the optical interrogators. |
| SLD | A superluminescent diode optical source |
| Source/receiver coupler | A coupler optically connected to a light source and a receiver. |
| TDM | Time Division Multiplexing and/or Demultiplexing. |
| TDM Assembly | Any device which produces a plurality of time differentiated optical signals from a single optical input signal, and/or combines a plurality of time differentiated optical input signals into a single optical output signal. |
| WDM | Wavelength Division Multiplexing and/or Demultiplexing. |
| WDM coupler | Any device which divides and/or combines input optical signals according to their wavelength for output. |

What is claimed is:

1. An orientation sensor system using optical interrogation, multiplexing and telemetry comprising;
    an orientation sensor comprising;
        a moveable structure with a surface of reflective and non-reflective areas;
        a plurality of optical interrogators sufficiently close to said surface to distinguish said areas;
        said optical interrogators being optically connected to a sensor TDM assembly;
        said sensor TDM assembly connected through an optical waveguide to a source/receiver coupler;
    said source/receiver coupler being connected to a pulsed light source and a receiver with demultiplexing circuitry.

2. The orientation sensor system of claim 1 wherein said moveable structure is a right circular cylinder with a longitudinal axis, and further comprising a shaft disposed along the longitudinal axis of said moveable structure, and a magnet rotatably attached to said shaft and fixedly attached to said moveable structure, such that said magnet and said moveable structure may rotate together about said shaft under the influence of a magnetic field.

3. The orientation sensor system of claim 2 wherein said reflective areas and non-reflective areas form at least one row, with an optical interrogator disposed proximal to each of said at least one row, and said reflective areas and non-reflective areas in each of said at least one row alternate and are of an equal length, with said equal length of said reflective and non-reflective areas being unique to each of said at least one row.

4. The orientation sensor of claim 3 comprising at least one row pair, said row-pair having a first row and a second row, said first row displaying a pattern of reflective areas and non-reflective areas which alternate and traverse an equal angle, said second row containing an identical pattern of reflective areas and non-reflective areas as said first row which is shifted relative to said pattern of reflective and non-reflective areas of said first row by one half of said equal angle.

5. The orientation sensor system of claim 1 wherein said moveable structure is a flat circular disk with two major surfaces, a center, a normal axis passing through its center at a right angle to said major surfaces, and further comprising a shaft disposed along said normal axis of said moveable structure fixedly attached to said moveable structure at its center, and a magnet fixedly attached to said shaft, such that said magnet and said moveable structure may rotate together under the influence of a magnetic field about said normal axis.

6. The orientation sensor system of claim 5 wherein said reflective areas and non-reflective areas are disposed upon at least one of said major surfaces to form at least one concentric row, with an optical interrogator disposed proximal to said at least one concentric row, and said reflective areas and non-reflective areas in said at least one concentric row alternate and traverse an equal angle, with said traversed angle of said reflective and non-reflective areas being unique to each of said at least one row.

7. The orientation sensor of claim 6 wherein said reflective areas and non-reflective areas are disposed upon at least one of said major surfaces to form at least one concentric row pair, wherein said concentric row-pair has a first concentric row and a second concentric row, said first concentric row displaying a pattern of reflective areas and non-reflective areas which alternate and which traverse an equal angle, said second concentric row containing the same number of alternating reflective areas and non-reflective areas, traversing the same equal angle, as said first concentric row, and shifted relative to said reflective areas and non-reflective areas of said first concentric row by one half of said equal angle.

8. The orientation sensor system of claim 2 or 5 further comprising dither circuitry which produces a time-varying magnetic field of sufficient magnitude and orientation to overcome any static friction encountered by said magnet.

9. The orientation sensor system of claim 1, 2 or 5 wherein said sensor TDM assembly comprises a 1×n optical coupler; said 1×n coupler connected by n optical fibers each of different delay times to n 1×m couplers; said 1×m couplers connected by m optical fibers each of different delay times to m of said optical interrogators.

10. The orientation sensor of claim 1 which is gimbal mounted.

11. The orientation sensor system of claim 1 wherein said source/receiver coupler is optically connected to an intermediate TDM assembly, said intermediate TDM assembly being connected through a plurality of branch waveguides to a plurality of orientation sensors.

12. The orientation sensor system of claim 1 further comprising said source/receiver coupler being connected through a wavelength division multiplexing (WDM) coupler and a plurality of branch waveguides to a plurality of orientation sensors, and a second WDM coupler connected between said source/receiver coupler and a plurality of receivers.

13. The orientation sensor system of claim 2 or 5 wherein said orientation sensor is a component of a hydrophone array.

14. A method of measuring the orientation of a platform comprising the following steps;
 a) producing a light pulse;
 b) delivering said light pulse through a source/receiver coupler to a sensor TDM assembly;
 c) using said sensor TDM assembly to divide said light pulse into at least two time differentiated light pulses;
 d) delivering said at least two time differentiated light pulses through optical interrogators to a surface of a moveable structure having reflective and non-reflective areas indicative of the orientation of a platform with respect to a reference frame;
 e) using said optical interrogators to collect reflected light pulses from said surface;
 f) using said sensor TDM assembly to time multiplex said reflected pulses to produce a time multiplexed signal;
 g) delivering said time multiplexed signal through said source/receiver coupler to a receiver;
 h) using said receiver to time division demultiplex said time multiplexed signal and determine the orientation of said platform with respect to a reference frame.

15. A method of measuring the orientation of at least one platform using a plurality of orientation sensors comprising the following steps;
 a) producing a light pulse;
 b) delivering said light pulse through a source/receiver coupler to an intermediate TDM assembly which divides said light pulse into at least two time differentiated first stage light pulses;
 c) delivering each of said at least two time differentiated first stage light pulses through a separate branch waveguide to a sensor TDM assembly;
 d) using said sensor TDM assembly to divide each of said time differentiated first stage light pulses into at least two time differentiated second stage light pulses;
 e) delivering said at least two time differentiated second stage light pulses through optical interrogators to a surface of a moveable structure having reflective and non-reflective areas indicative of the orientation of a platform with respect to a reference frame;
 f) using said optical interrogators to collect reflected light pulses from said surface;
 g) using said sensor TDM assembly to time division multiplex said reflected light pulses to produce a signal;
 h) delivering said signal from each of said at least two orientation sensors through said separate branch waveguides to said intermediate TDM assembly;
 i) using said intermediate TDM assembly to time division multiplex said signals received from said at least two orientation sensors;
 j) delivering said time division multiplexed signals from said intermediate TDM assembly through said source/receiver coupler to a receiver;
 k) using said receiver to time division demultiplex said time multiplexed signal and determine for each orientation sensor the orientation of said platform with respect to a reference frame.

16. A method of measuring the orientation of at least one platform using a plurality of orientation sensors comprising the following steps;
 a) producing a light pulse;
 b) delivering said light pulse to a first WDM coupler;
 c) said first WDM coupler dividing said light pulse into at least two wavelength differentiated light pulses;
 d) delivering each of said wavelength differentiated light pulses through a separate branch waveguide to a sensor TDM assembly;
 e) using said sensor TDM assembly to divide each of said wavelength differentiated light pulses into at least two time differentiated light pulses;
 f) delivering said at least two time differentiated light pulses through optical interrogators to a surface of a moveable structure having reflective and non-reflective areas indicative of the orientation of a platform with respect to a reference frame;
 g) using said optical interrogators to collect reflected light pulses from said surface;
 h) using said sensor TDM assembly to time division multiplex said reflected light pulses to produce a signal;
 i) delivering said time division multiplexed signal to said first WDM coupler;
 j) using said first WDM coupler to wavelength multiplex said signals from said corresponding orientation sensors into a wavelength multiplexed signal;
 k) delivering said wavelength multiplexed signal to a second WDM coupler;
 l) using said second WDM coupler to demultiplex said wavelength multilpexed signal;
 m) delivering each of said time division multiplexed signals of a given wavelength to a separate receiver;
 n) using said receiver to demultiplex said time multiplexed signal and determine the orientation of said platform with respect to a reference frame.

17. The method of measuring the orientation of at least one platform of claim 14, 15, or 16 wherein said moveable structure is maintained level by gimbal mounting.

18. The method of reading an orientation of at least one orientation sensor of claim 14, 15, or 16 wherein said orientation sensor is part of a hydrophone array.

* * * * *